United States Patent [19]

Baker et al.

[11] Patent Number: 5,113,659

[45] Date of Patent: May 19, 1992

[54] SOLAR THERMAL ENERGY RECEIVER

[75] Inventors: Karl W. Baker, Akron; Miles O. Dustin, North Olmsted, both of Ohio

[73] Assignee: The United States of America as represented by the Administrator of the National Aeronautics and Space Administration, Washington, D.C.

[21] Appl. No.: 676,910

[22] Filed: Mar. 27, 1991

[51] Int. Cl.$^5$ .............................................. F03G 6/00
[52] U.S. Cl. ..................................... 60/641.8; 60/659; 126/433; 126/436
[58] Field of Search ............................. 126/433, 436; 60/641.8–641.15, 659

[56] References Cited

U.S. PATENT DOCUMENTS

| | | | |
|---|---|---|---|
| 4,335,578 | 6/1982 | Osborn et al. | 60/641.8 |
| 4,421,102 | 12/1983 | Posnansky et al. | 126/438 |
| 4,586,334 | 5/1986 | Nilsson et al. | 60/641.15 |
| 4,706,740 | 11/1987 | Mahefkey | 165/104.14 |
| 4,715,183 | 12/1987 | Meijer et al. | 60/524 |
| 4,738,304 | 4/1988 | Chalmers et al. | 165/13 |

Primary Examiner—Allen M. Ostrager
Attorney, Agent, or Firm—James A. Mackin; Gene E. Shook; Guy M. Miller

[57] ABSTRACT

A plurality of heat pipes in a shell receive concentrated solar energy and transfer the energy to a heat activated system. To provide for even distribution of the energy despite uneven impingement of solar energy on the heat pipes, absence of solar energy at times, or failure of one or more heat pipes, energy storage means are disposed on the heat pipes which extend through a heat pipe thermal coupling means into the heat activated device. To enhance energy transfer to the heat activated device, the heat pipe coupling cavity means may be provided with extensions into the device. For use with a Stirling engine having passages for working gas, heat transfer members may be positioned to contact the gas and the heat pipes. The shell may be divided into sections by transverse walls. To prevent cavity working fluid from collecting to the extensions, a porous body is positioned in the cavity.

19 Claims, 4 Drawing Sheets

SOLAR THERMAL ENERGY RECEIVER

ORIGIN OF THE INVENTION

The invention described herein was made by employees of the United States Government and may be manufactured and used by or for the Government for governmental purposes without the payment of any royalties thereon or therefor.

TECHNICAL FIELD

This invention relates to solar heat collectors and is directed more particularly to a solar heat management system which collects, stores and evenly distributes solar heat to a utilization device such as a Stirling engine, for example.

Space vehicles generally rely on batteries and/or solar cells to provide needed electrical power. Such devices produce d-c electrical power which requires the use of ancillary electrical equipment such as d-c to d-c converters, inverters or the like to generate a-c power or stepped-up d-c voltages. Additionally, solar cell arrays, depending on the power needed, usually are very large in area. This parameter creates a drag problem for any vehicle orbiting at a distance from earth at which the atmosphere has more than minimal density. Thus, solar cell arrays large enough to generate sufficient d-c power for a space station, for example, would produce an unacceptable magnitude of drag.

Large space vehicles such as a space station will use great amounts of electrical power. Studies have shown that for many applications solar dynamic power systems have distinct advantages over other space power systems such as batteries and solar cells.

Solar heat can provide the energy for various Rankine and Brayton cycle systems to drive a-c generators. A Stirling engine driving an alternator appears to be one of the best systems. However, it is important that heat be distribution uniformly around the heater head of a Stirling engine. Thus, failure of one or more of the heat pipes of a solar dynamic system or uneven application of solar energy to the heat pipes must not significantly affect the uniform distribution of heat to the Stirling engine heater head. Additionally, a heat management system used with a Stirling engine for a space vehicle must provide heat in both the sun and shade portions of an orbit and be highly reliable. Furthermore, critical thermal stresses must be eliminated to avoid failure.

BACKGROUND ART

U.S. Pat. No. 4,335,578 to Osborn et al discloses a solar converter which transports solar heat via a secondary fluid to a heat exchanger which contains a primary working fluid. The secondary fluid is contained in the space between two concentric tubes which comprise a solar receiver and is then directed to the heat exchanger. The secondary fluid changes from a vapor to a liquid in the heat exchanger.

U.S. Pat. No. 4,421,102 to Posnansky et al teaches that heat distribution in gas containing quartz tubes can be improved by disposing transparent strips in the tubes, each strip absorbing a portion of solar radiation.

U.S. Pat. No. 4,706,740 to Mahefkey discloses a ventable survivable heat pipe vapor chamber for disposing of excess heat aboard a spacecraft. Multiple heat pipes utilize a capillary of wicking action between them so that failure of one does not cause a disruption of the heat emission characteristics. Wedged grooves along the interior of the radiator cavity enhance condensation and allow for the rapid return of the working fluid to the wick.

U.S. Pat. No. 4,715,183 to Meijer et al discloses an external heating system for a heat engine such as a Stirling engine, which system permits thermal energy to be provided by solar energy or fuel combustion sources. In order that either source may be employed, there is provided a complexly shaped heat pipe evaporator section having an enclosed cavity for receiving solar energy and another section forming hollow fins, the section being exposed to hot combustion gases.

U.S. Pat. No. 4,738,304 to Chalmers et al discloses a heat radiator having multiple heat pipes. Sensors monitor the flow of heat transfer fluids in each of the pipes and control respective valves in each of the pipes. A sudden reduction in flow in one of the pipes would indicate a leak and the leaking pipe would be cut out of the system by closing valves at respective opposite ends of the pipe. Thus, leaks caused in the radiator of a space vehicle by impacting particles can be isolated to prevent loss of the system.

SUMMARY OF THE INVENTION

In accordance with the invention, multiple heat pipes are disposed in an insulated containment shell which has an aperture for receiving concentrated sunlight. Heat storage means are carried on the heat pipes which extend into a heat utilization device such as a Stirling engine heater head. Disposed between the heat storage means and the Stirling engine heater head is a heat pipe coupling cavity through which the heat pipes extend in heat exchanging relationship. The heat pipe coupling cavity also includes legs which extend into the heater head. Thus, the heat pipe coupling cavity not only transfers heat between the heat pipes, but enhances heat transfer to the Stirling engine heater head.

In a preferred embodiment, finned members are disposed radically outwardly of the cavity legs in good heat transfer contact both with respective heat pipes and a pair of adjacent cavity legs. Gas to be heated passes over the fins.

In an alternate embodiment, tubular members encase the heat pipes through the heat coupling cavity and into the heater head. Longitudinal grooves in the outer surface of the tubular members within the heater head provide heating passages for the Stirling engine working gas.

DESCRIPTION OF THE PREFERRED EMBODIMENT

Figure 1:
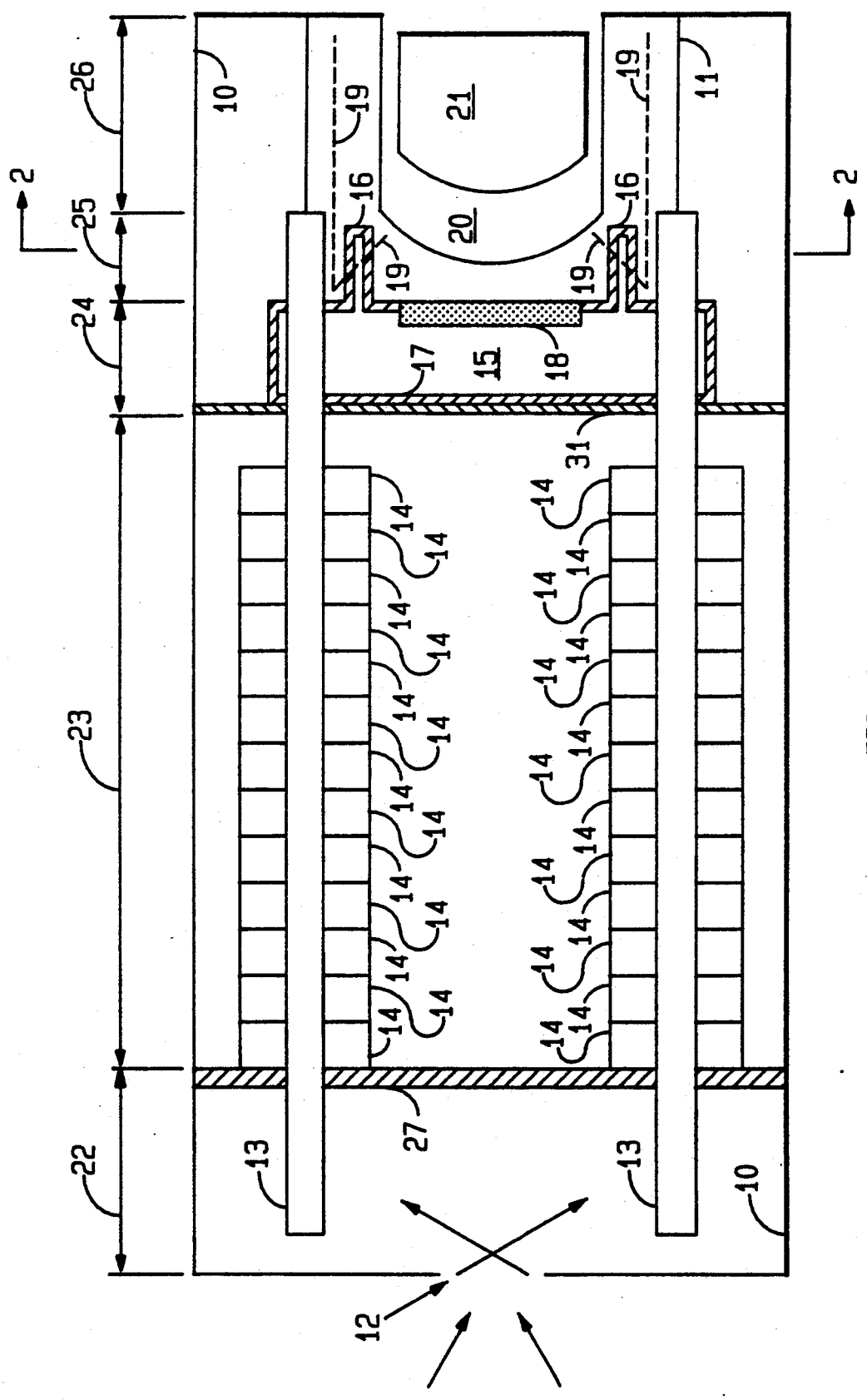
FIG. 1 is an axial section of a preferred embodiment of the solar dynamic power system embodying the invention.

Referring now to FIG. 1, there is shown an insulated containment shell 10 having one end attached to a utilization device such as the heater head 11 of a Stirling engine. The other end of the shell 10 includes an aperture 12 for admitting concentrated sunlight as from a shaped mirror or lens, for example. Thus, the containment shell 10 is always oriented to maximize the concentrated sunlight coming through aperture 12. The positioning of the solar dynamic system is effected by the space vehicle on which it is carried.

A plurality of heat pipes 13 are disposed in the shell 10 and extend from its apertured end to engage the heater head 11 in heat transfer relationship. Thermal storage canisters 14 are disposed on the heat pipes 13 to provide heat to the heat pipes 13 when insufficient sunlight is received through the aperture 12 as would occur during part of the orbit of a space vehicle.

Heat pipes are well-known and are lined with wicking material such as wire mesh or screen. The heat pipes and screen are made of a high temperature material, such as superalloys or the like or even refractories, while the working fluid is Na or K but preferably is Na.

Figure 3:
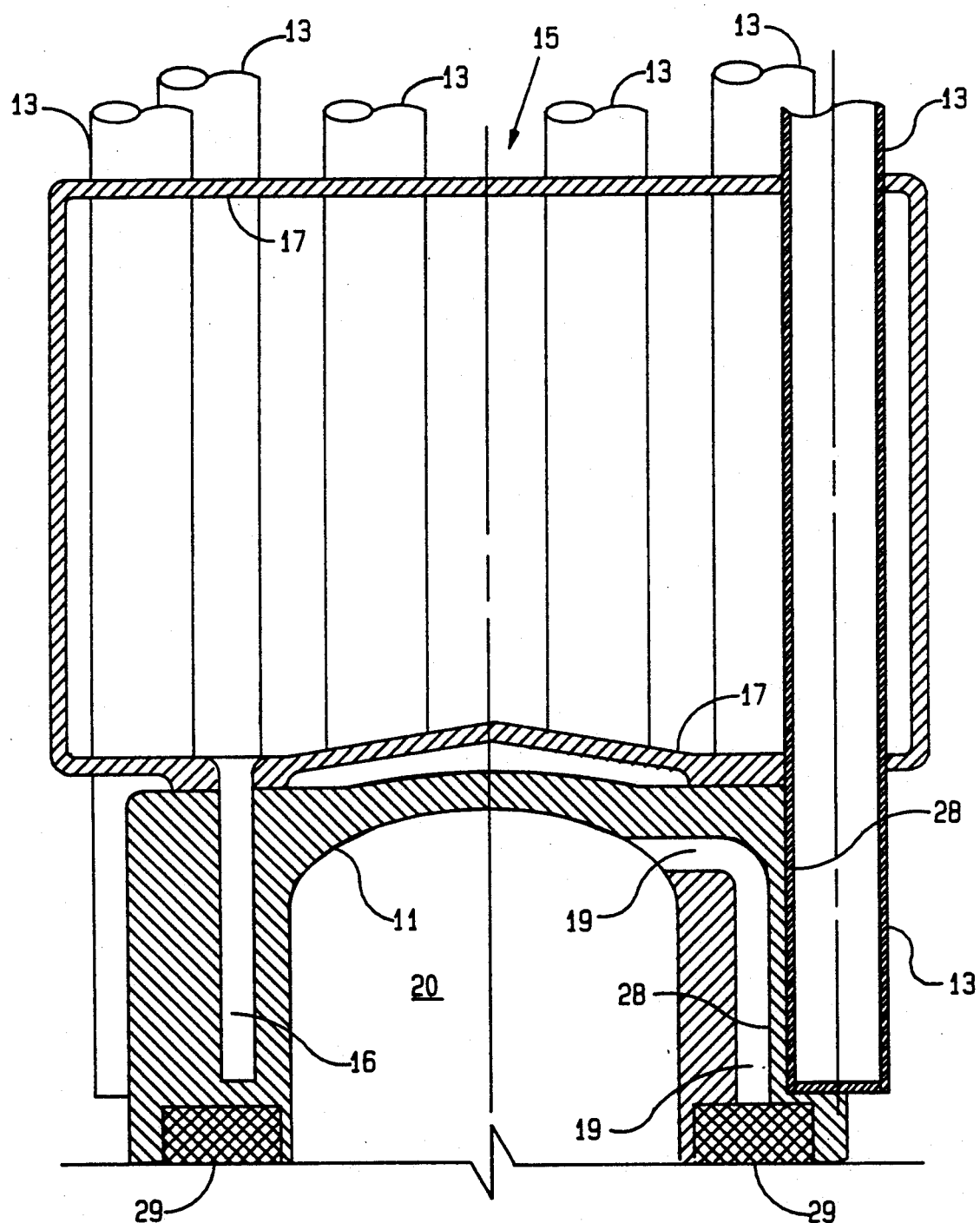
FIG. 3 is a partial axial section taken along the line 3—3 of FIG. 2.
Figure 4:
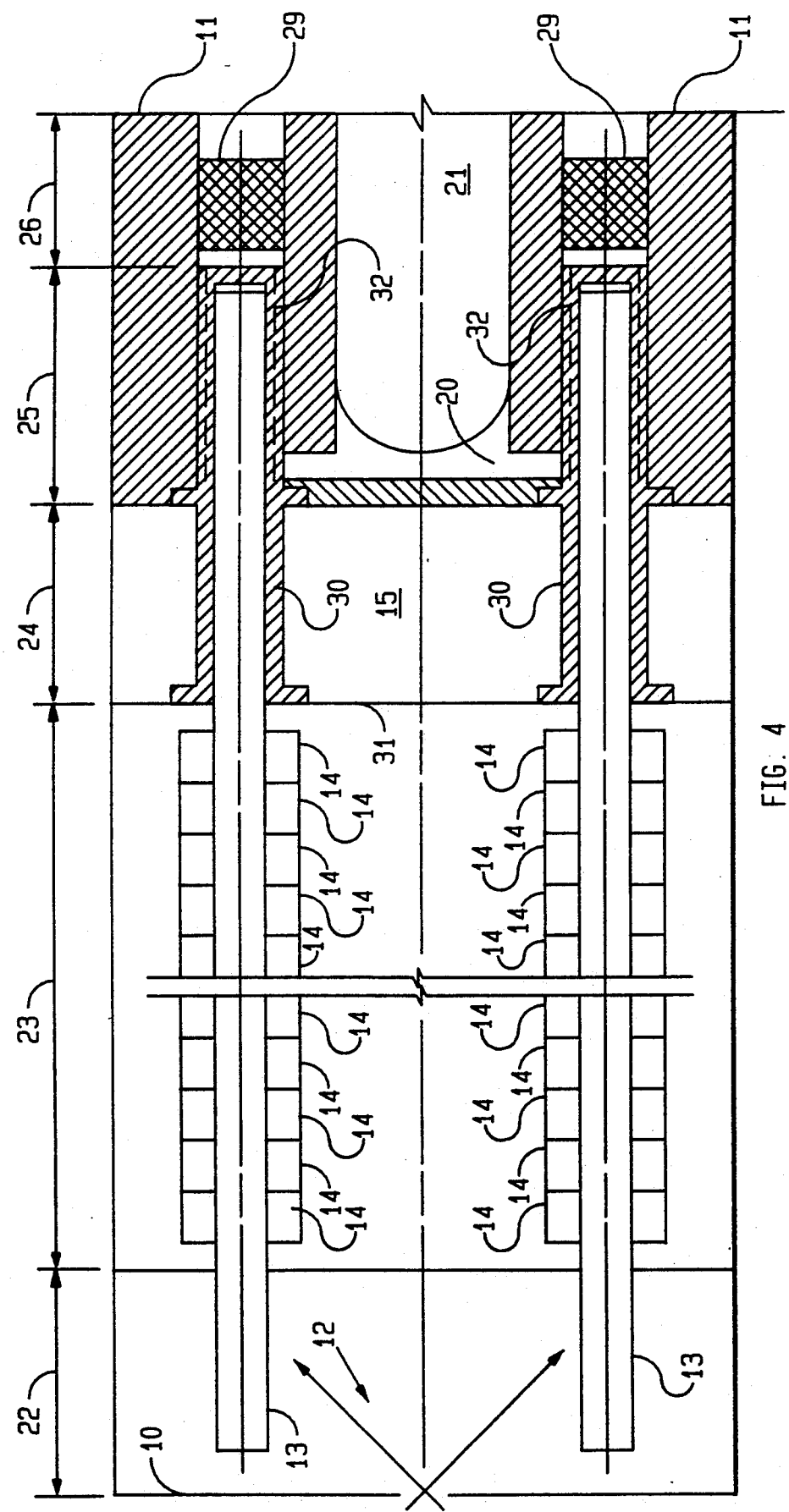
FIG. 4 is an axial section showing an alternate embodiment of the invention.

The heat pipe coupling cavity 15 is cylindrical and parallel to shell 10 with a diameter much grater than its height. Because the cavity 15 contains working fluid and wicking 17 it is essentially a heat pipe and, because of its disproportionately small height or thickness to diameter ratio, may be termed a squat heat pipe. Its diameter is perpendicular to the longitudinal axis of the shell 10 so that spout heat pipe is disposed transversely in shell 10 as shown in FIGS. 1, 3 and 4.

The heat storage canisters are also made of a high temperature superalloy material and contain a thermal energy storage material such as $LiF/Ca_2F$ which melts at about 1050° K. Energy storage is accomplished by melting and freezing of the thermal energy storage material in the canisters.

To the end that thermal energy will be transferred from hotter heat pipes to cooler ones and that thermal energy will be applied substantially uniformly to the heater head 11, there is provided a heat pipe coupling cavity 15 through which heat pipes 13 extend in heat transfer relationship therewith. In addition to thermally coupling the heat pipes 13, coupling cavity 15 increases the efficiency of heat transfer from the heat pipes 13 to the heater head 11 by means of legs 1.6 which extend into the heater head 11 to provide additional, short paths for transfer of heat from the heat pipes 13 via the cavity 15 to the heater head 11. The cavity 15 and the legs 16 are lined with a wicking material 17 which transports the working fluid of cavity 15 which, as in the case of the heat pipes 13, is preferably Na or as an alternate, K. The cavity 15 and the wicking material are high temperature material such as superalloys, refractories or the like.

To prevent excess working fluid from collecting in the legs 16, an absorber 18 made of a porous material such as a porous body of Inconel is attached to the inner surface of the wall of cavity 15 from which legs 16 extend. Passageways in the heater head 11 are indicated by numerals 19 and allow the working gas from the chamber 20 above the piston 21 to heat regenerator elements (not shown) of the Stirling engine after picking up heat from heat pipes 13 and cavity legs 16.

Double ended arrows 22, 23, 24, 25 and 26 indicate sections of the solar energy management system embodying the invention wherein 22 is the solar energy receiving end section, 23 is the thermal energy storage section, 24 is the heat pipe coupling cavity section, 25 is the interface between the heater head 11 and the legs 16 of the coupling cavity 15, and 26 is the head portion of a Stirling engine. Sections 23, 24 and 25 comprise a heat processing section.

A transverse wall 31 is attached to cavity 15. The wall 31 serves to separate section 23 from section 24 as well as supporting the heat pipe coupling cavity 15.

Generally the shell 10, heat pipes 13, thermal storage canisters 14, cavity 15 and porous block 18 are all made of a single material. This provides materials compatibility which enhances welding and minimizes corrosion.

Figure 2:
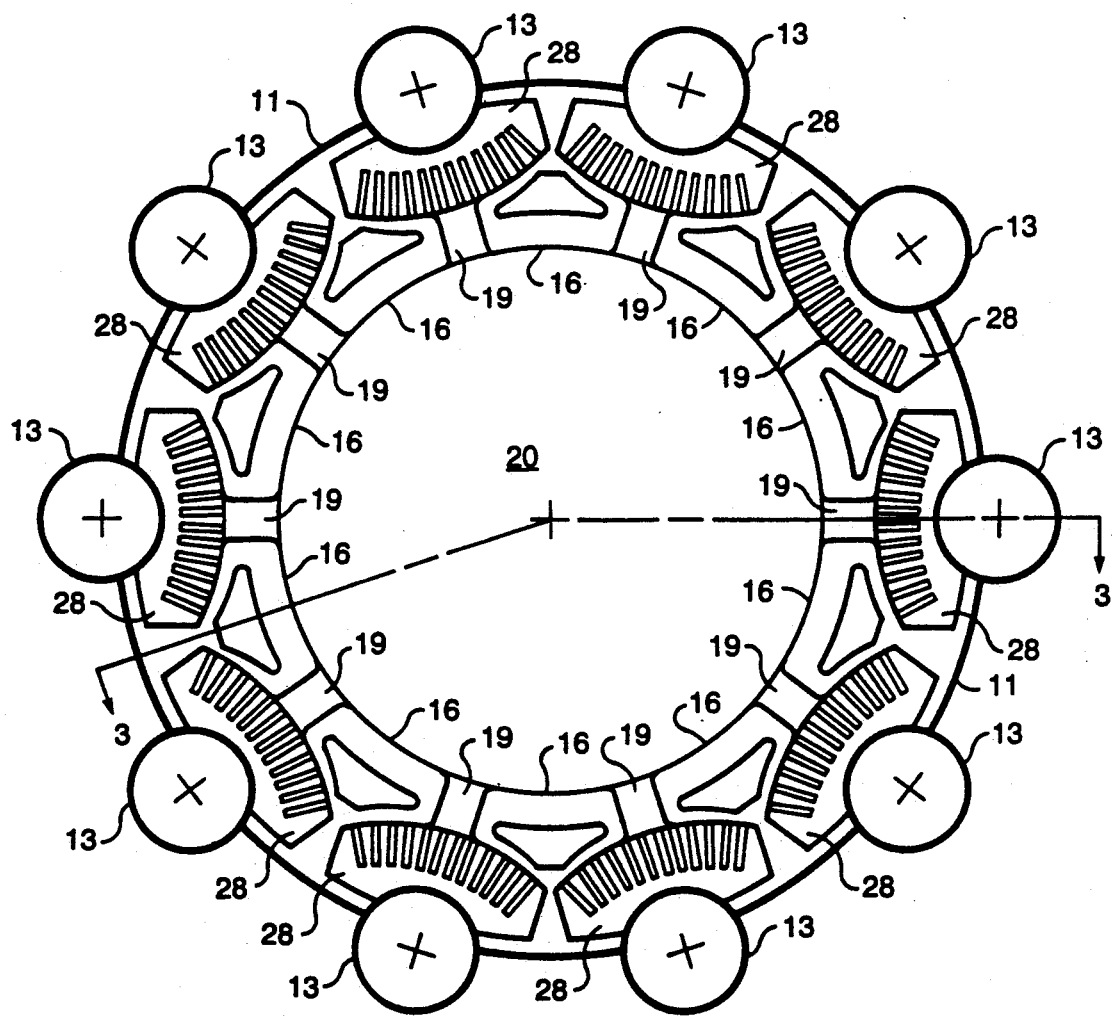
FIG. 2 is a transverse section of the solar heat management system of FIG. 1 taken along the line 2—2.

FIG. 2 is a transverse cross section of the solar dynamic system of FIG. 1 taken along the line 2—2. Parts in FIG. 2 which are the same parts as in FIG. 1 are identified by numerals which are the same as the numerals of FIG. 1. As shown, a plurality of heat pipes 13 are each partially embedded in the cylindrical heater head 11 at circumferentially spaced positions.

To enhance heat transfer from the heat pipes to the Stirling engine working gas, a finned heat transfer member 28 is disposed at each heat pipe in heat transfer contact with a significant portion of the circumference of the heat pipe. The heat transfer member may be made of any material having high thermal conductivity and a coefficient of expansion which will not cause unacceptable mechanical stresses in the system. Inconel is a preferred material.

A surface of each finned member 28 opposite the surface in contact with the heat pipe is in contact with adjacent leg members 16. Working gas from the chamber 20 is forced by the piston 21 shown in FIG. 1 into heat transfer passageways 19 where it passes over the fins of the finned members 28 to pick up thermal energy. This thermal energy will be transferred to regenerators (not shown) of the Stirling engine. The Stirling engine regenerators are not part of the invention, but function to reheat the Stirling engine working gas as part of the cycle of operation.

FIG. 3 is a longitudinal section of a portion of the solar powered thermal management system of FIG. 1 taken along the line 3—3 of FIG. 2. Parts in FIG. 3 corresponding to parts in FIGS. I and 2 are identified by the same respective numerals. As shown in FIG. 3, heat pipes 13 extend through the heat coupling cavity 15 into the heater head 11. The heat pipes 13 are sealed where they pass through the walls of the coupling cavity 15 by suitable means such as brazing or the like. The working fluid in cavity 15 transfers heat between the various heat pipes, with the heat being transferred from the hotter heat pipes to the cooler ones. As a result, all the heat pipes 13 where they engage the heater head 11 are at substantially the same temperature. Thus, whether one or more heat pipes become inoperative or whether some heat pipes receive more solar energy than others, thermal energy is supplied relatively uniformly around the heater head 11.

The cavity legs 16 which are lined with wicking 17 as discussed concerning FIG. 1 extend, as shown, into heater head 11. This arrangement greatly increases the transfer of thermal energy from the heat pipes to the heater head 11.

During operation of the Stirling engine, the working gas passes back and forth from chamber 20 to Stirling engine regenerators 29. The fins of the heat transfer member 28 disposed between the passage 19 and a respective heat pipe 13 additionally enhance the transfer of thermal energy from the heat pipes and from the legs 16 to the working gas.

FIG. 4 is an alternate embodiment of the invention in which the portion of the heat pipes delineated by the double ended arrows 24 and 25 is encased in respective tubular members 30. The tubular members 30 are in heat transfer contact with the heat pipes and are also heated by the working fluid of the coupling cavity 15. The tubes 30 are also in thermal contact with the heater 11 and, additionally, are provided with longitudinal grooves 32. These grooves allow the working gas flowing from chamber 20 to the regenerators 29 and back, to pick up heat from the tubes 30. Thus, the coupling cavity, the extension of the heat pipes 13, with the tubes 30 and the grooves 31 cooperate to uniformly and efficiently to deliver thermal energy obtained from the sun to the heater head of a Stirling engine.

While the invention has been described for use with a Stirling engine in a space vehicle, it will be understood that a thermal management system embodying the invention may have terrestrial applications where solar energy must be collected, stored and distributed to a utilization device uniformly and with high efficiency.

It will be understood that the above described invention may be changed or modified without departing from its spirit and scope as set forth in the claims amended hereto.

We claim:

1. A solar powered thermal management system for collecting and storing solar energy and transferring it uniformly to a heat utilization device, said system comprising:
   an insulated containment shell having a first end including an aperture for receiving concentrated sunlight and a second end engaging a heat utilization device;
   a plurality of heat pipes extending from within said heat utilization device toward said first end of said shell to be subjected to concentrated sunlight, said heat pipes being connected to said heat utilization device in heat transferring relationship;
   thermal energy storage means disposed on said heat pipes to transfer heat stored therein to said heat pipes when the solar energy received is less than a predetermined amount; and
   heat pipe coupling means disposed between said thermal energy storage means and said heat utilization device said heat pipe coupling means enclosing at least a portion of the length of each heat pipe, to transfer heat from hotter to cooler heat pipes whereby heat input to said heat utilization device is evenly distributed.

2. The system of claim 1 wherein said heat pipe coupling means is a thin-walled cavity through which said heat pipes extend, said cavity being lined with a high temperature wick material and including a high temperature working fluid, said cavity essentially being a squat heat pipe.

3. The thermal management system of claim 2 wherein said heat pipe coupling cavity includes a plurality of legs which extend from a first wall of said cavity into said heat utilization device in heat transfer relationship, said legs being miniature heat pipes.

4. The thermal management system of claim 3 wherein a porous body is disposed in said cavity on said first wall from which the legs extend and between the legs to absorb excess working fluid thereby preventing flooding of the legs with working fluid.

5. The thermal management system of claim 1 and including a first transverse wall which separates said containment shell into a solar energy receiving section (22) and a solar heat processing section (23, 24, 25).

6. The system of claim 5 and including a second transverse wall in said containment shell adjacent to said coupling cavity and separating the same from the thermal storage means.

7. The thermal management system of claim 4 wherein said heat utilization device is a Stirling engine having a heater head for receiving said heat pipes and said cavity legs, said heater head including a plurality of passageways for working gas to pass back and forth from a chamber to a regenerator, each passageway lying between a heat pipe and a leg extending from said heat pipe coupling cavity to receive heat from both.

8. The thermal management system of claim 7 wherein each passageway includes a high thermal conductivity member, said member having a first surface in contact with a heat pipe and a second surface opposite said first surface and comprised of fins, said body enhancing transfer of heat from the heat pipes to the working gas.

9. The thermal management system of claim 1 wherein said heat storage canisters on any heat pipe are in heat conducting contact with the heat storage canisters on at least one other heat pipe.

10. The thermal management system of claim 9 wherein there are at least three heat pipes with the heat storage canisters on any heat pipe being in heat conducting contact with the heat storage canisters on two heat pipes adjacent thereto.

11. The solar powered thermal management system of claim 1 wherein the position of each heat pipe within said coupling cavity and within said heat utilization device is encased in a tubular member which makes high heat conduction contact with said heat pipe and with said heat utilization device.

12. The system of claim 11 wherein said tubular member is disposed coaxially in a passageway of said heat utilization device and is provided with longitudinal grooves whereby heat is transferred to a gas flowing through the grooves to or from a second passageway perpendicular to said grooves.

13. The system of claim 12 wherein said heat utilization device is a Stirling engine having a heater head forming a chamber above a piston and including a regenerator in said first passageway, said second passageway communicating with said chamber.

14. A solar heat collecting, processing and distribution apparatus for providing thermal energy to a heat actuated system, said apparatus comprising:
   a cylindrical shell having an aperture at one end for admitting solar energy;
   attachment means at the other end of said shell connecting the same to said heat activated system;
   a squat heat pipe disposed transversely in said shell adjacent said heat actuated system and defining a heat coupling section;
   a plurality of elongated heat pipes disposed longitudinally in said shell radially outwards of its longitudinal axis, said heat pipes extending from said one end of said shell, through said squashed heat pipe and into said heat actuated system said heat pipes having a high thermal conductivity relationship with said squat heat pipe and said heat actuated system;
   a plurality of heat storage canisters disposed on respective ones of said elongated heat pipes; and
   a transverse wall in said shell for supporting said squashed heat pipe and for separating said thermal storage section from said heat coupling section;

said high thermal conductivity between said squashed heat pipe, said elongated heat pipes, said heat storage canisters and said heat actuated system providing substantially uniform heat timewise and physically to said heat actuated device.

15. The apparatus of claim 14 wherein the working fluid in said squashed and elongated heat pipes is Na.

16. The apparatus of claim 14 wherein said heat storage canisters contains $LiF/Ca_2F$.

17. The apparatus of claim 14 wherein said squashed heat pipe includes a plurality of hollow, cylindrical members which extend into said heat actuated device to provide heat thereto thereby supplementing the heat provided by said heat pipes.

18. The apparatus of claim 17 wherein a porous body of material selected from the group of materials consisting of superalloys and refractories is disposed in said squashed heat pipe to absorb any excess working fluid thereby maintaining a prescribed amount in said hollow, cylindrical members.

19. The apparatus of claim 14 wherein said heat actuated systems is a Stirling engine.

* * * * *

UNITED STATES PATENT AND TRADEMARK OFFICE
CERTIFICATE OF CORRECTION

PATENT NO. : 5,113,659

DATED : May 19, 1992

INVENTOR(S) : Karl W. Baker and Miles O. Dustin

It is certified that error appears in the above-identified patent and that said Letters Patent is hereby corrected as shown below:

In Column 3, line 26, delete "spout" and substitute --squat--therefor.

In Column 5, line 39, delete ".".

Signed and Sealed this

Twenty-eighth Day of September, 1993

Attest:

BRUCE LEHMAN

Attesting Officer

Commissioner of Patents and Trademarks